US008109311B2

(12) United States Patent
Tsuchiya

(10) Patent No.: US 8,109,311 B2
(45) Date of Patent: *Feb. 7, 2012

(54) BOOKBINDING APPARATUS AND IMAGE FORMING SYSTEM

(75) Inventor: Tsuyoshi Tsuchiya, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 12/592,612

(22) Filed: Nov. 30, 2009

(65) Prior Publication Data

US 2010/0132893 A1 Jun. 3, 2010

(30) Foreign Application Priority Data

Dec. 3, 2008 (JP) ................................ 2008-308310

(51) Int. Cl.
*B32B 41/00* (2006.01)

(52) U.S. Cl. ................ 156/359; 412/8; 412/11; 412/12; 412/37; 156/64

(58) Field of Classification Search .................. 156/359, 156/64; 412/8, 11, 12, 37
See application file for complete search history.

(56) References Cited

FOREIGN PATENT DOCUMENTS

| | | |
|---|---|---|
| JP | 10-035138 A | 2/1998 |
| JP | 2008-080603 A | 4/2008 |

OTHER PUBLICATIONS

Translation of JP 2008-090603 A. Published Apr. 10, 2008.*

* cited by examiner

*Primary Examiner* — George Koch
(74) *Attorney, Agent, or Firm* — Holtz, Holtz, Goodman & Chick PC

(57) ABSTRACT

A bookbinding apparatus for bookbinding a sheet by applying adhesive including, an adhesive tank for storing adhesive;

first and second heaters for heating the adhesive;

a first adhesive temperature sensor for detecting temperature of the adhesive at a first position;

a second adhesive temperature sensor for detecting temperature of the adhesive at a second position;

an agitation member for agitating the adhesive in the adhesive tank; and a control device, wherein the control device operates, the agitation member after the heaters are turned on, then turns off the second heater and continues to have the first heater on after the second heater has been turned off when the second adhesive temperature sensor detects that adhesive temperature has reached a first temperature that is higher than an application temperature, and then completes a warm-up when the first adhesive temperature sensor detects that adhesive temperature has reached the application temperature.

14 Claims, 5 Drawing Sheets

BOOKBINDING APPARATUS AND IMAGE FORMING SYSTEM

RELATED APPLICATION

The present application is based on Patent Application No. 2008-308310 filed at the Japan Patent Office on Dec. 3, 2008 and which is hereby incorporated herein in its entirety.

TECHNICAL FIELD

The present invention relates to an image forming system and a Bookbinding apparatus.

The image forming system includes an image forming apparatus for forming an image on a sheet and a bookbinding apparatus for receiving the sheet onto which the image forming apparatus has formed the image and performing a bookbinding process on the sheet.

BACKGROUND

In a printing field called POD (print on demand), the image forming system configured by the image forming apparatus and the bookbinding apparatus creates a book without using a printing plate.

For example, as disclosed in Unexamined Japanese Patent Application Publication No. 2008-80603, many of the bookbinding apparatuses for POD use a gluing apparatus as a device for bookbinding the sheet bundle with a binding process. Since the structure of the gluing apparatus is simple and small, the gluing apparatus is suitable for combining into the image forming apparatus.

In Unexamined Japanese Patent Application Publication No. 2008-80603, a temperature of an adhesive storage section heater, a temperature of an application device heater and a temperature of adhesive are separately detected in an application apparatus that includes the adhesive storage section heater and the application device heater. The above mentioned adhesive storage section heater and the above mentioned application device heater are separately controlled based on the detection temperature. Thus, the temperature of the adhesive in the adhesive storage section becomes even and the adhesive is quickly melted.

In Unexamined Japanese Patent Application Publication No. H10-35138, a warm-up time is shortened and the power consumption is controlled by having different number of heaters for the warm-up time and an application time.

Also as pointed out in Unexamined Japanese Patent Application Publication No. H10-35138, shortening of the wait time, which is from when the adhesive heating device is turned on to when the adhesive is melted and becomes ready to be applied, is a technical object needed to be solved in the bookbinding apparatus using a gluing apparatus.

The wait time is the time from when a heating device for heating the adhesive is turned on to when the temperature of the adhesive rises to the temperature in which the adhesive become applicable, namely, a warm-up time. In Unexamined Japanese Patent Application Publication No. 2008-80603 and Unexamined Japanese Patent Application Publication No. H10-35138, the warm-up time is shortened by using a plurality of heaters as the heating device and controlling the plurality of heaters separately.

However, there is a limitation in such warm-up time shortening device. Thus, the warm-up time cannot be shortened enough.

As described above, in the warm-up, the adhesive is heated until the temperature of the adhesive reaches the application temperature. Therefore, the application temperature is set as a standard of the control. The warm-up completes when the adhesive temperature is detected to have reached the standard temperature.

In such warm-up control, in order to shorten the warm-up time, the speed of raising the temperature needs to be increased. Therefore, there is a need to increase the power of the heater. Thus, an increase in power consumption cannot be avoided.

In Unexamined Japanese Patent Application Publication No. 2008-80603, the plurality of heaters is separately controlled so that the adhesive temperature is uniformly raised and the warm-up time can be shortened. However, in order to shorten the warm-up time, the number of heaters or the power of the heater needs to be increased. Since Unexamined Japanese Patent Application Publication No. H10-35138 is in the similar manner, a heater that is turned on only at the warm-up time is needed. Thus, since there is large power consumption during the warm-up, the maximum power of the apparatus becoming large cannot be avoided.

SUMMARY

The aspects of the present invention are any one of the bookbinding apparatus or the image forming system described as follows.

1. A bookbinding apparatus for bookbinding a sheet with adhesive comprising:

an adhesive tank for storing adhesive;

a first heater for heating the adhesive;

a second heater for heating the adhesive;

a first adhesive temperature sensor for detecting temperature of the adhesive at a first position;

a second adhesive temperature sensor for detecting temperature of the adhesive at a second position that differs from the first position;

an agitation member for agitating the adhesive in the adhesive tank; and a control device, wherein the control device operates the agitation member after the first heater and the second heater are turned on, turns off the second heater and continues to have the first heater on after the second heater has been turned off when the second adhesive temperature sensor detects that adhesive temperature has reached a first temperature that is higher than an application temperature, and completes a warm-up when the first adhesive temperature sensor detects that adhesive temperature has reached the application temperature.

2. An image forming system comprising:

an image forming apparatus for forming an image on a sheet, and a bookbinding apparatus according to item “1” for performing a bookbinding process on the sheet ejected from the image forming apparatus.

DESCRIPTION OF THE PREFERRED EMBODIMENTS

Hereafter, the present invention will be described in reference to an embodiment. However, the present invention is not limited to the embodiment.

Figure 1:
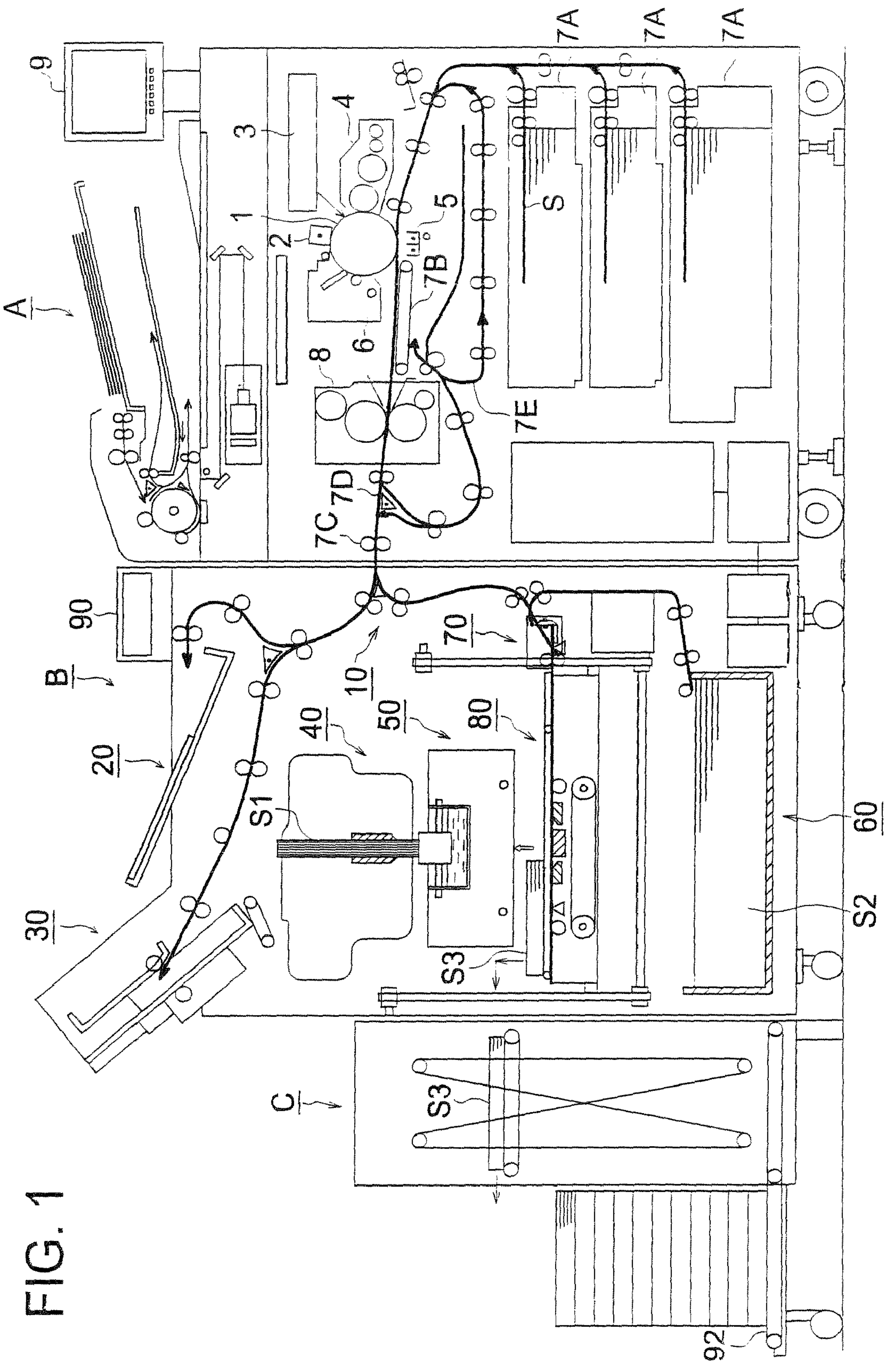
FIG. 1 illustrates an entire configuration of an image forming system pertaining to an embodiment of the present invention.

FIG. 1 illustrates an entire configuration of an image forming system related to an embodiment of the present invention.

An image forming system illustrated in the embodiment includes an image forming apparatus "A" and a bookbinding apparatus "B". In this embodiment, a booklet storage apparatus "C" for storing a booklet being a bound book is connected to a latter stage of the above mentioned bookbinding apparatus "B". The booklet storage apparatus "C" conveys and loads a booklet S3 ejected from the bookbinding apparatus "B" onto a cart 92.

<Image Forming Apparatus "A">

The image forming apparatus "A" forms an image according to an electrophotography process. The image forming apparatus "A" includes an image forming device in which a charging device 2, an image exposure device 3, a development device 4, a transfer discharge device 5 and a cleaning device 6 are arranged in a periphery of a rotatable photoreceptor 1.

With respect to the image forming device, after the charging device 2 has performed a uniform charge on the surface of the photoreceptor 1, the image exposure device 3 uses a laser beam to perform an exposure scan and forms a latent image based on image data, and the development device 4 performs a reversal development of the latent image and forms a toner image on the surface of the photoreceptor 1.

A sheet "S" sheet-fed from a sheet storage device 7A is sent to a transfer position. After the transfer discharge device 5 has transferred the toner image onto the sheet "S" at the transfer position, an electric charge of the sheet "S" is eliminated. Then the sheet "S" is separated from the photoreceptor 1. The conveyance device 7 conveys the sheet "S". Further, the fixing device 8 performs a heat fixing process on the sheet "S". Then the sheet "S" is ejected by the sheet ejection roller 7C.

In case when the image formation is performed on both sides of the sheet "S", a conveyance switching device 7D conveys the sheet "S" onto which the fixing device has performed the heat fixing to a conveyance path branched from a normal sheet ejection path. The reverse conveyance device 7E switches back the sheet "S" to reverse the front and back of the sheet "S". Then the reverse conveyance device 7E conveys the sheet "S" to the transfer position again. An image is formed on the backside of the sheet "S" at the transfer position.

The sheet "S" onto which the fixing device 8 has performed a fixing process and the image has been formed is ejected from the sheet ejection roller 7C to outside the apparatus. The sheet "S" ejected from the sheet ejection roller 7C is sent into the bookbinding apparatus "B".

The cleaning device 6 removes the development agent remaining on the surface of the photoreceptor 1 after the image processing has been performed to prepare for the next image formation.

An operation display section 9 that includes an input device and a display device is arranged on the upper section of the image forming apparatus "A".

<Bookbinding Apparatus"B">

Figure 2:
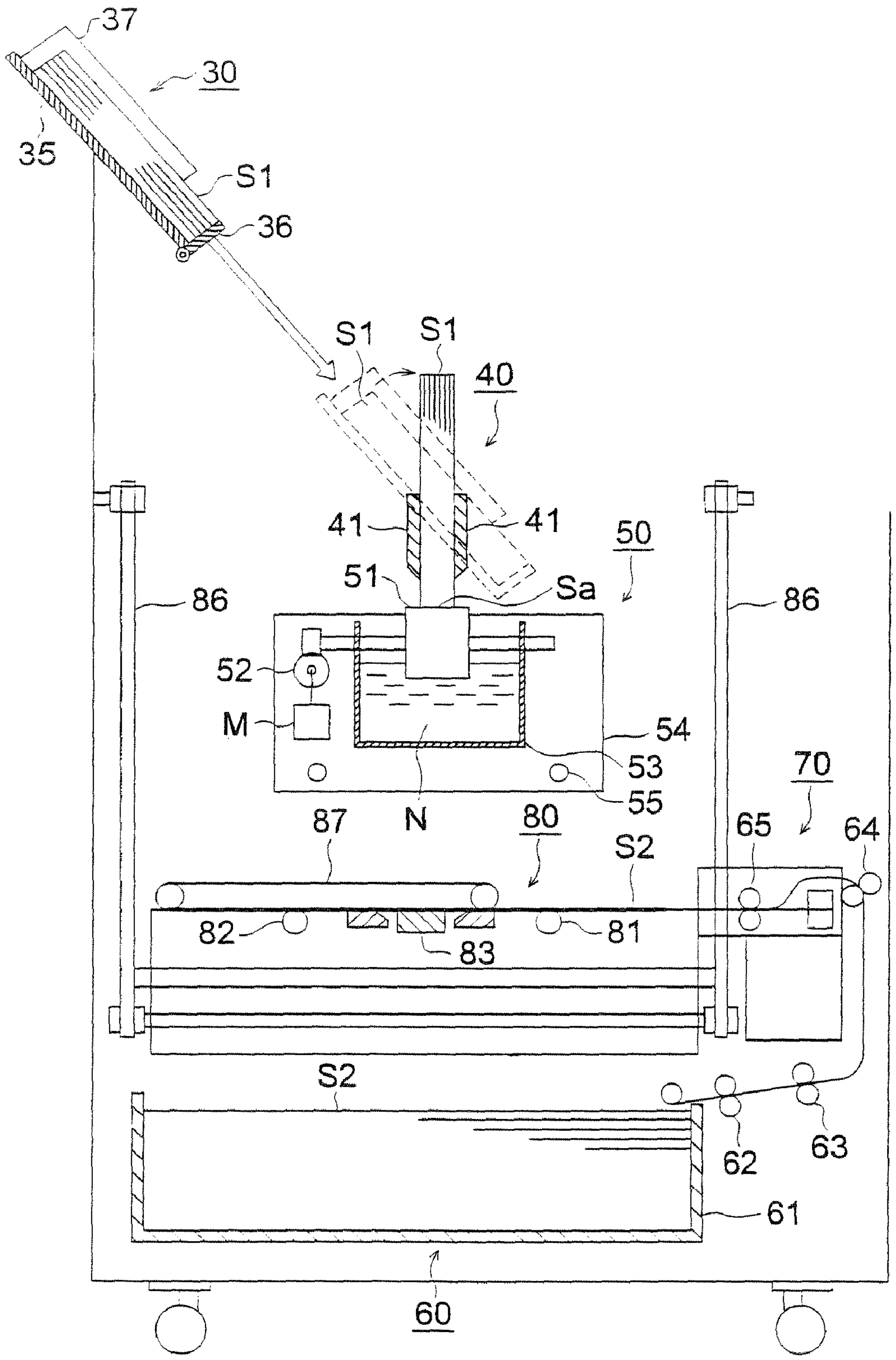
FIG. 2 illustrates a configuration of a main section of a bookbinding apparatus pertaining to an embodiment of the present invention.

The bookbinding apparatus "B" will be described using FIGS. 1 and 2. FIG. 2 illustrates a configuration of a main section of the bookbinding apparatus.

The bookbinding apparatus "B" is configured by a sheet conveyance section 10, a sheet delivery section 20, a sheet bundle storage section 30, a sheet bundle conveyance section 40, an adhesive application section 50, a cover sheet feed section 60, a cover sheet cutting section 70, a cover sheet holding section 80 and an operation display section 90.

The sheet "S" introduced to the sheet conveyance section 10 from the image forming apparatus "A" is conveyed to the sheet delivery section 20, to the sheet bundle storage section 30 or to the cover sheet holding section 80 by a plurality of conveyance rollers and a conveyance path-switching gate.

In case when there is no specification for a bookbinding process, the conveyance path-switching gate is set to directly eject the sheet "S" ejected from the image forming apparatus "A" onto a delivery tray of the sheet delivery section 20.

In case when there is a specification for the bookbinding process, the sheet conveyance section 10 conveys the sheet "S" onto which the image formation has been performed by the image forming apparatus to the sheet bundle storage section 30. Then a plurality of sheets "S" is accumulated onto the sheet bundle storage section 30. Thus, a sheet bundle S1 is formed.

The sheet bundle conveyance section 40 conveys the sheet bundle S1 to a predetermined position. Then the adhesive application section 50 applies adhesive on a spine Sa of the sheet bundle S1.

A cover sheet S2 held by the cover sheet holding section 80 is pasted on the spine Sa of the sheet bundle S1 onto which the adhesive has been applied. The cover sheet S2 is folded along both edges of the spine Sa of the sheet bundle S1. Then a booklet S3 is created.

The sheet bundle storage section 30 includes a sheet loading platen 35, which is arranged in inclination, a sheet rear edge positioning member 36, which is capable of moving, and an aligning member 37, which aligns the sheet in the width direction.

The sheet, which has been ejected from the image forming apparatus "A" and sent in by the sheet conveyance section 10, is sequentially placed on the sheet loading platen 35. Then a plurality of the sheets forms the sheet bundle S1.

After the aligning has been performed, the sheet bundle S1 loaded on the sheet loading platen 35 of the sheet bundle storage section 30 is grasped by a grasping device 41. In case when the grasping device 41 grasps the sheet bundle S1, the drive of a drive device not illustrated moves the sheet rear edge positioning member 36 below the sheet loading platen 35. Then the sheet rear edge positioning member 36 retracts.

After moving to a diagonally lower section illustrated with broken line, the grasping device 41, which has grasped the sheet bundle S1 rotates and holds the sheet bundle S1 in upright state so that the spine Sa of the sheet bundle S1 onto which the adhesive application process is performed is facing downward. Then the grasping device 41 stops at a predetermined position.

On the other hand, a sheet feed device 62 separates and feeds the cover sheet S2 stored in a cover sheet loading device

61 of the cover sheet feed section 60. Then conveyance rollers 63, 64 and 65 convey the cover sheet S2. Further, conveyance rollers 81 and 82 of the cover sheet holding section 80 conveys the cover sheet S2. Then the cover sheet S2 is stopped at a predetermined position.

In case when the length of the sheet cover S2 is longer than a necessary length at the time of performing a wrap bookbinding process to the sheet bundle S1, the cover sheet cutting section 70 arranged on the right hand side of the conveyance roller 65 performs a cutting of the cover sheet S2 so that an excessive portion of the cover sheet S2 is removed in advance.

An adhesive tank 53 is arranged on a moving body 54 held by a cylindrical guide 55. The adhesive tank 53 moves in the direction that is perpendicular to the sheet surface of FIG. 2. The home position of the moving body 54 is at the far side of the bookbinding apparatus. The moving body 54 moves to the near side of the bookbinding apparatus at the time of application.

An application roller 51 moves along the spine Sa of the sheet bundle S1 in the direction perpendicular to the sheet surface of FIG. 2 by the drive of a motor M and a drive system 52.

The cover sheet holding section 80 moves up and down by an ascending descending device 86.

After the moving body 54 has moved to the near side of the bookbinding apparatus from the home position, the application roller 51 moves back and forth in the direction of arrows W2 and W3 (described later, refer to FIG. 3) by the drive of the motor M. Then the adhesive is applied to the spine Sa of the sheet bundle S1.

After the application is complete, the moving body 54 returns to the home position. Then the cover sheet holding section 80 ascends and pastes the cover sheet S2 on the spine Sa. "83" is a pressing member for pasting the cover sheet S2 onto the spine Sa securely.

The booklet S3 is created by pasting the cover sheet S2 on the sheet bundle S1. Then the booklet S3 is conveyed by a belt 87 and is ejected to the booklet storage apparatus "C".

<Adhesive Application Section>

Figure 3:
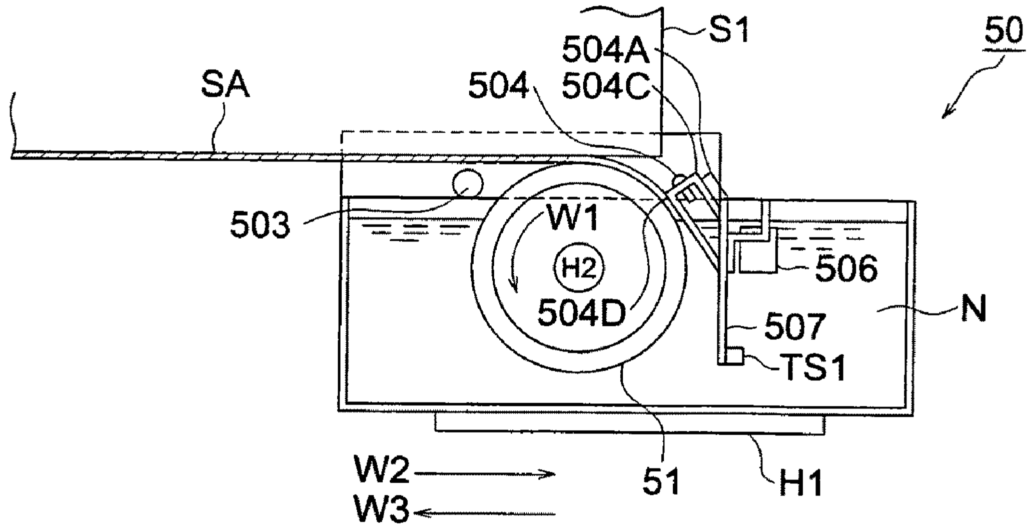
FIG. 3 illustrates a configuration of an adhesive application section.

FIG. 3 illustrates the adhesive application section 50.

The adhesive application section 50 includes the adhesive tank 53 for storing adhesive N that has been melted and liquefied, an application roller 51 as an agitation member that agitates the adhesive N, a regulating member 503, a regulating member 504, a tank heater H1 being a first heater for heating the adhesive, a roller heater H2 being a second heater for heating the adhesive, an adhesive temperature sensor TS1 being a first temperature sensor for detecting temperature of the adhesive in the adhesive tank and a remaining amount sensor 506.

The agitation member for agitating the adhesive is configured by the application roller 51 in the embodiment illustrated. However, an adhesive application member and an agitation member may be configured separately.

As illustrated, the tank heater H1 is arranged at the bottom section of the adhesive tank 53. Then the tank heater H1 heats the entire adhesive tank 53.

Figure 4:
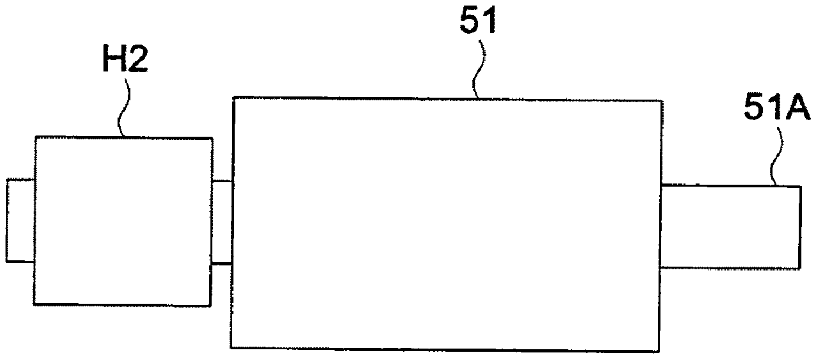
FIG. 4 illustrates an arrangement of a roller heater.

As illustrated in FIG. 4, the roller heater H2 heats a shaft 51A of the application roller 51. The shaft 51A is structured by metal. The heat of the shaft 51A heats the entire application roller 51. Then the adhesive on the application roller 51 is heated.

A supplying device delivers the adhesive N in a pellet state into the adhesive tank 53.

The adhesive in the pellet state is heated and melted. Then the adhesive in the pellet state becomes the adhesive N that is liquefied.

The adhesive is delivered from the supplying device corresponding to a detection signal of the remaining quantity-sensor 506 so that the surface of the adhesive N is maintained at a fixed level.

"503" is a cylindrical regulating member whose cross-section is nearly circular. "504" is a regulating member. "504" is fixed by having the both ends of a non-application area screwed onto a plate-shaped holding member 507.

The regulating member 504 includes a main scraping section 504A and an auxiliary scraping section 504C. The regulating member 504 is a device for scraping the adhesive so that the adhesive applied onto the spine of the sheet bundle S1 by the application roller 51 becomes a predetermined thickness.

"504D" is a regulating member for regulating an adhesive layer thickness on the application roller 51.

The regulating member 503 is arranged on an opposite side of the above mentioned regulating member 504 having the application roller 51 between the regulating member 503 and the regulating member 504. The regulating member 503 is a cylindrical bar shaped member for regulating the application thickness of the adhesive.

The application roller 51 applies the adhesive on the spine Sa of the sheet bundle by having the drive of the motor M (refer to FIG. 2) move the application roller 51 back and forth along the spine Sa of the sheet bundle in the direction indicated with the arrows W2 and W3 while having the drive of a motor not illustrated rotate the application roller 51 in the direction indicated with the arrow W1.

At the time of a forward movement (in the direction of W2), mainly the regulating member 503 regulates the application amount of the adhesive N. At the time of a backward movement (in the direction of W3), mainly the regulating member 504 regulates the application amount of the adhesive. These regulations form an even adhesive layer on the spine Sa of the sheet bundle.

<Control at the Time of the Warm-Up>

A warm-up time for the adhesive application section 50, namely, from the time when the tank heater H1 is turned on to the time when the adhesive is melted to a state that the adhesive is applicable, requires several minutes to ten minutes.

Shortening of a wait time and improving work efficiency are one of the important technical objects in the development of a bookbinding apparatus.

In the present invention, the warm-up time has been shortened by using a plurality of heaters and heating the adhesive up to the first temperature that is higher than the above mentioned application temperature with the second heater in the process of heating the adhesive up to an application temperature with the first heater.

The above mentioned first temperature is higher than the application temperature. It is preferable that the temperature of the first temperature to be at the maximum temperature that does not deteriorate the adhesive.

Figure 5:
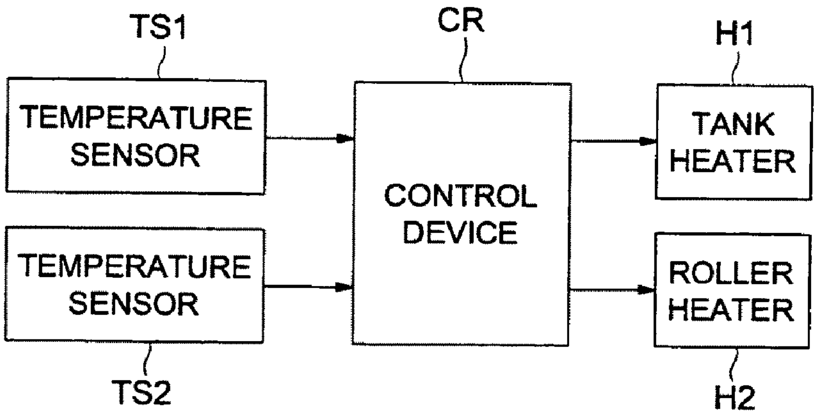
FIG. 5 illustrates a block diagram of a control system for performing a heat control of adhesive in the bookbinding apparatus pertaining to an embodiment of the present invention.
Figure 6:
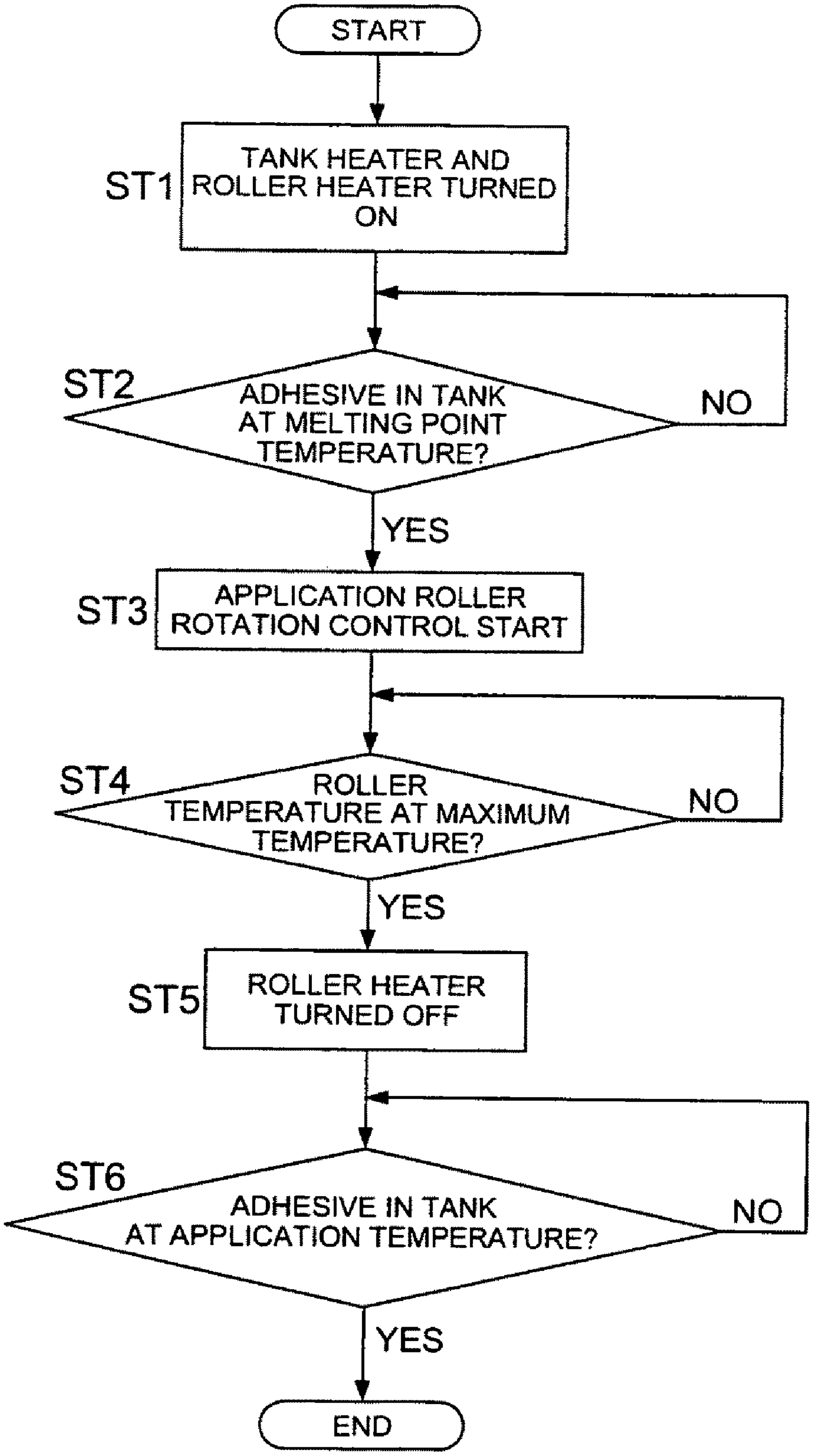
FIG. 6 illustrates a flow chart of a heat control process.

FIG. 5 illustrates a block diagram of a control system for performing a heat control of the adhesive in the bookbinding apparatus pertaining to an embodiment of the present invention. FIG. 6 illustrates a flow chart of a first example of a heat control process.

A control device CR controls ON and OFF of the tank heater H1 and the roller heater H2 based on an output of a adhesive temperature sensor TS1 being a first adhesive temperature sensor for detecting the temperature of the adhesive in the adhesive tank 53 and on an output of a adhesive temperature sensor TS2 being a second adhesive temperature sensor for detecting the temperature of the adhesive on the application roller 51.

As illustrated in FIG. 3, the adhesive temperature sensor TS1 contacts the adhesive N and detects the adhesive temperature. The adhesive temperature sensor TS2 is arranged inside the application roller 51. The adhesive temperature sensor TS2 indirectly detects the temperature of the adhesive on the application roller 51 by detecting the temperature of the application roller 51.

In STEP ST1, the tank heater H1 and the roller heater H2 are turned on. Then the heating starts.

In STEP ST2, whether a detection temperature of the adhesive temperature sensor TS1 has reached to a melting point (for example, 90 degrees Celsius) of the adhesive N being the second temperature that is lower than the application temperature is monitored. In case when the detection temperature of the adhesive temperature sensor TS1 has reached the second temperature, a rotation control of the application roller 51 starts in STEP TS3.

The starting time of the rotation control of the application roller 51 may be set to a prescribed period of time after the heater has been turned on in STEP ST1. This prescribed period of time can be determined from an experimental result of the experiment conducted in advance for measuring the time from when the heater turned on to when the adhesive temperature has reached the melting point.

When the application roller 51 is attempted to rotate before the adhesive temperature reaches the melting point, a large load is put on the motor being the drive source of the roller. This leads to a corruption of the motor. Thus, the application roller 51 rotates smoothly in the liquefied adhesive N by having the application roller 51 stopped until the adhesive temperature reaches the melting point and having the application roller 51 rotate after the adhesive temperature has reached to the melting point.

The rotation control of ST3 is an intermittent drive control that repeats a rotation and a stop of the application roller 51 at an interval of two to three seconds.

The rotation control of ST3 agitates the adhesive N well so that the adhesive N in the adhesive tank 53 is quickly and uniformly heated. In particular, the adhesive on the application roller 51 and the adhesive N in the adhesive tank 53 are mixed.

In STEP ST4 following STEP ST3, the adhesive temperature sensor TS2 monitors whether the temperature of the application roller 51 has reached the maximum temperature or not. In case when the temperature of the application roller 51 has reached the maximum temperature, the roller heater H2 is turned off.

The maximum temperature of the application roller 51 is the maximum temperature in which the adhesive N does not deteriorate. For example, the maximum temperature may be set to 185 degrees Celsius.

In case when the roller temperature has reached the maximum temperature (Yes on ST4), the roller heater H2 is turned off (ST5). The tank heater H1 continues to be power on even when the roller heater H2 is turned off.

In the following STEP ST6, whether the detection temperature of the adhesive temperature sensor TS1 has reached the application temperature or not is monitored.

For example, the application temperature may be set to 165 degrees Celsius.

As a result of the temperature monitoring in STEP ST6, in case when the temperature of the adhesive N in the adhesive tank 53 has reached the application temperature, the warm-up completes.

Although not illustrated in FIG. 6, the roller heater. H2 is turned off after the completion of the warm-up. Then the on and off of the tank heater H1 is controlled to maintain the temperature of the adhesive N in the adhesive tank 53 to the application temperature.

The change in the adhesive temperature during the warm-up is illustrated in FIG. 7.

Figure 7B:
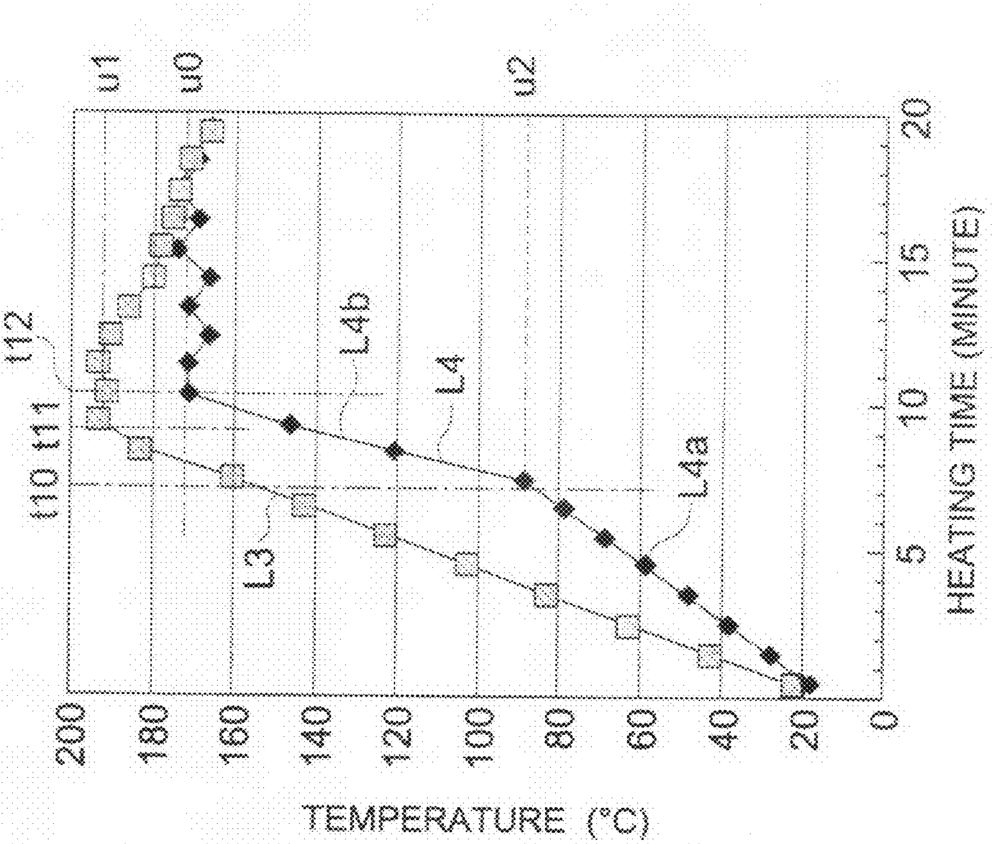
FIG. 7*b* illustrates a graph indicating a temperature of the adhesive at the time of warm-up.

FIG. 7 (*a*) illustrates the change in the adhesive temperature in the conventional control. FIG. 7*b* illustrates the change in the adhesive temperature in the control pertaining to an embodiment of the present invention.

The conventional control will be described first.

Conventionally, the application roller 51 had been stopped during the warm-up. The tank heater H1 and the roller heater H2 have also been used in conventional control.

Figure 7A:
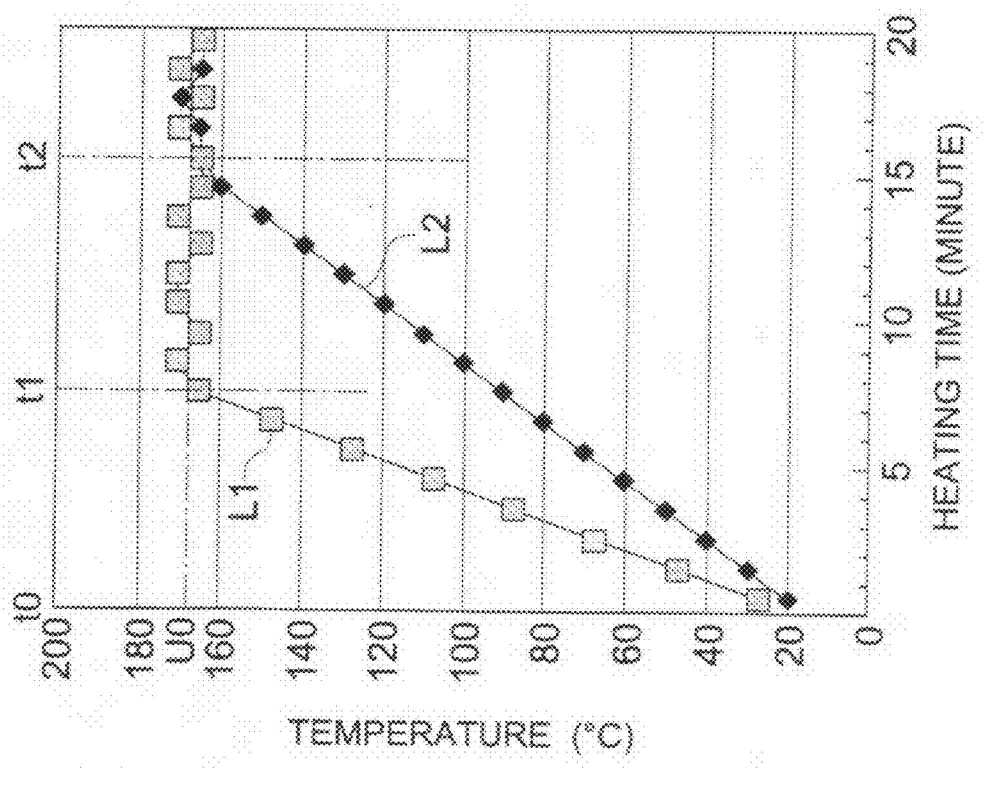
FIG. 7*a* illustrates a graph indicating a temperature of the adhesive at the time of warm-up.

In FIG. 7*a*, at time to, the tank heater H1 and the roller heater H2 are turned on, and the heating starts.

Since the adhesive on the application roller 51 is heated by the tank heater H1 and the roller heater H2, the rising rate of the temperature of the adhesive on the roller is higher than the rising rate of the temperature of the adhesive in the adhesive tank 53. Thus, as indicated by a curved line L1, the temperature of the adhesive on the application roller linearly and abruptly rises.

At time t1 when the temperature of the adhesive on the application roller 51 has reached the application temperature u0, the roller heater H2 changes from a continuously turned on state to a turned on and off state. The temperature of the adhesive on the application roller 51 is maintained at the application temperature u0 by the on and off control after the time t1.

On the other hand, as a curved line L2 indicates, the temperature of the adhesive in the adhesive tank 53 moderately rises. Then the temperature of the adhesive in the adhesive tank 53 reaches to the application temperature u0 at time t2.

After time t2, the on and off control is performed on the tank heater H1. Thus, the temperature of the adhesive in the adhesive tank 53 is maintained at the application temperature u0.

In FIG. 7*b*, at time t0, the tank heater H1 and the roller heater H2 are turned on. Then the heating starts.

Since the temperature of the adhesive on the application roller 51 is heated by the tank heater H1 and the roller heater H2, the rising rate of the temperature of the adhesive on the application roller 51 is higher than the rising rate of the temperature of the adhesive in the adhesive tank 53. Thus, as indicated by a curved line L3, the temperature of the adhesive on the application roller linearly and abruptly rises.

The roller heater H2 is turned off at time t11 when the temperature of the adhesive on the application roller 51 has reached the maximum temperature u1.

On the other hand, just as an initial straight line section L4*a* of a curved line L4, the temperature of the adhesive in the adhesive tank 53 moderately rises. The temperature of the adhesive in the adhesive tank 53 reaches to the adhesive melting point u2 at time t10.

At time t10 when the temperature of the adhesive in the tank has reached the melting point u2, the rotation control of the application roller 51 is started. That is, the application roller 51 repeats rotation and stop to agitate the adhesive N.

The rising rate of the temperature of the adhesive in the tank increases by the agitation of the adhesive N just as indicated by the straight line section L4*b* of the curved line L4.

As curved lines L3 and L4 indicate, time t11 when the temperature of the adhesive on the application roller 51 reaches the maximum temperature elapses faster than the time that the temperature of the adhesive N in the adhesive tank 53 reaches to the application temperature. Therefore, as illustrated, the tank heater H1 continues heat even after the roller heater H2 has been turned off. Thus the temperature of the adhesive continues to rise.

After time t12 when the temperature of the adhesive N in the adhesive tank 53 has reached the application temperature u0, the on and off control is performed on the tank heater H1 and the temperature of the adhesive in the adhesive tank 53 is maintained at the application temperature u0.

As illustrated in FIG. 6, the warm-up is complete when the adhesive temperature sensor TS1 detects that the temperature of the adhesive N in the adhesive tank 53 reaches the application temperature.

In the embodiment of the present invention of FIG. 7*b*, the warm-up is completed at time t12 that is approximately 10 minutes after the warm-up has started.

On the other hand, in the conventional example illustrated in FIG. 7*a*, the warm-up time is 15 minutes.

The rotation of application roller 51 contributes to shortening the warm-up time illustrated in FIG. 7*b*. However, the warm-up time can be shortened also by having the roller heater H2 heats the adhesive on the application roller to the maximum temperature that is higher than the application temperature, and by having the rotation of the application roller 51 mix the high temperature adhesive with the adhesive N in the adhesive tank 53 so that the rising rate of the temperature of the adhesive becomes high.

Thus, the warm-up time is significantly shortened by the present invention.

In the embodiment illustrated in FIGS. 6 and 7, the adhesive N in the adhesive tank 53 and the adhesive on the application roller 51 are mixed by having the application roller 51 being an adhesive supplying member rotate when the temperature of the adhesive N reaches the melting point.

However, it is also possible to perform the following control.

The tank heater H1 and the roller heater H2 are turned on and the warm-up is started. In case when the adhesive temperature sensor TS2 detects the maximum temperature, the roller heater H2 is turned off.

On the other hand, the tank heater H1 continues to be on. The tank heater H1 is turned off when the adhesive temperature sensor TS1 detects that the temperature of the adhesive N in the adhesive tank 53 has reached the temperature that is slightly lower than the application temperature. The adhesive N is agitated by the rotation of the application roller 51. Then the warm-up completes.

When the high temperature adhesive on the application roller 51 is mixed with the adhesive N, the temperature of the adhesive N rises and reaches to the application temperature.

In the image forming system, the wait time of the image forming apparatus "A" is shorter than the wait time of the bookbinding apparatus "B". Therefore, the bookbinding apparatus "B" influences the work efficiency of the entire image forming system. The present invention shortens the wait time of the bookbinding apparatus "B" and the work efficiency of the image forming system is remarkably improved.

What is claimed is:

1. A bookbinding apparatus for bookbinding a sheet by applying adhesive comprising:
- an adhesive tank for storing adhesive;
- a first heater for heating the adhesive;
- a second heater for heating the adhesive;
- a first adhesive temperature sensor for detecting temperature of the adhesive at a first position;
- a second adhesive temperature sensor for detecting temperature of the adhesive at a second position that differs from the first position;
- an agitation member for agitating the adhesive in the adhesive tank; and
- a control device, wherein the control device operates the agitation member during a warm-up process in which the adhesive is heated to an application temperature of the adhesive by the first heater and the second heater after the first heater and the second heater are turned on, then turns off the second heater and continues to have the first heater on after the second heater has been turned off when the second adhesive temperature sensor detects that adhesive temperature has reached a first temperature that is higher than the application temperature, and then completes the warm-up process when the first adhesive temperature sensor detects that adhesive temperature has reached the application temperature.

2. The bookbinding apparatus of claim 1;
wherein the control device performs to start the agitation member after the second heater has been turned off.

3. The bookbinding apparatus of claim 1;
wherein the control device performs to start the agitation member when the first adhesive temperature sensor detects that adhesive temperature has reached a second temperature that is lower than the application temperature.

4. The bookbinding apparatus of claim 1;
wherein the agitation member is an application roller.

5. The bookbinding apparatus of claim 1;
wherein the first heater heats the adhesive in the adhesive tank and,
the first adhesive temperature sensor detects the temperature of the adhesive in the adhesive tank.

6. The bookbinding apparatus of claim 4;
wherein the second heater heats the adhesive the adhesive on the application roller and,
the second adhesive temperature sensor detects the temperature of the adhesive on the application roll.

7. The bookbinding apparatus of claim 1;
wherein the control device controls the first heater to turn on and off based on the detected temperature by the first adhesive temperature sensor so as to maintain the temperature of the adhesive at the application temperature after a completion of the warm-up.

8. An image forming system comprising:
- an image forming apparatus for forming an image on a sheet, and
- a bookbinding apparatus of claim 1 for performing a bookbinding process on the sheet ejected from the image forming apparatus.

9. The image forming system of claim 8;
wherein the control device performs to start the agitation member after the second heater has been turned off.

10. The image forming system of claim 8;
wherein the control device performs to start the agitation member when the first adhesive temperature sensor detects that adhesive temperature has reached a second temperature that is lower than the application temperature.

11. The image forming system of claim 8;
wherein the agitation member is an application roller.

12. The image forming system of claim 8;
wherein the first heater heats the adhesive in the adhesive tank and, the first adhesive temperature sensor detects the temperature of the adhesive in the adhesive tank.

13. The image forming system of claim 11;

wherein the second heater heats the adhesive the adhesive on the application roller and, the second adhesive temperature sensor detects the temperature of the adhesive on the application roll.

14. The image forming system of claim 8;

wherein the control device controls the first heater to turn on and off based on the detected temperature by the first adhesive temperature sensor so as to maintain the temperature of the adhesive at the application temperature after a completion of the warm-up.

* * * * *